United States Patent [19]

Bartkowicz

[11] Patent Number: 5,092,290
[45] Date of Patent: Mar. 3, 1992

[54] ENGINE PISTON ASSEMBLY WITH PLANAR PIN MOUNTING SURFACE

[75] Inventor: Michael D. Bartkowicz, Orland Park, Ill.

[73] Assignee: Navistar International Transportation Corp., Chicago, Ill.

[21] Appl. No.: 581,933

[22] Filed: Sep. 13, 1990

[51] Int. Cl.⁵ ............................................. F02F 3/00
[52] U.S. Cl. .................................. 123/193.6; 92/220; 92/221
[58] Field of Search ............... 123/193 P; 92/216, 220, 92/212, 221

[56] References Cited

U.S. PATENT DOCUMENTS

| Re. 18,384 | 3/1932 | Nelson | 92/221 |
|---|---|---|---|
| 1,089,823 | 3/1914 | Day et al. | 92/220 |
| 2,194,247 | 3/1940 | Russel | 92/187 |
| 2,273,986 | 2/1942 | Pickett | 92/221 |
| 3,659,502 | 5/1972 | Friedman et al. | 92/212 |
| 4,083,292 | 4/1978 | Goloff | 92/220 |
| 4,433,616 | 2/1984 | Hauser | 92/220 |
| 4,603,617 | 8/1986 | Barth et al. | 92/220 |

Primary Examiner—Andrew M. Dolinar
Assistant Examiner—M. Macy
Attorney, Agent, or Firm—Dennis K. Sullivan

[57] ABSTRACT

An internal combustion engine piston assembly is provided wherein the underside of the piston has planar load bearing surfaces disposed perpendicularly to the axis thereof and the ends of the piston pin are provided with mating planar surfaces for fastening the pin to the underside of the piston head. The piston pin further includes a cylindrical bearing surface disposed between the ends for connection to the connecting rod.

11 Claims, 2 Drawing Sheets

ENGINE PISTON ASSEMBLY WITH PLANAR PIN MOUNTING SURFACE

BACKGROUND OF THE INVENTION

This invention relates to an internal combustion engine piston assembly having a piston pin for connecting a piston to a connecting rod and, more particularly, to a piston assembly wherein the underside of the piston is provided with planar mounting surfaces radial to the piston axis and the piston pin has end portions with mating planar surfaces for connection of the pin to the piston.

THE PRIOR ART

Conventional piston pins for connecting pistons to connecting rods have a cylindrical configuration forming a bearing surface which engages a pin bore of a piston and a bearing bore in the connecting rod. While this construction has generally provided satisfactory operation, due to the round hole geometry of the pin bore and pin as well as variations in the machining process, high unit loading can occur which may produce distortion and cracking of the pin bore under heavy load conditions.

The Russel U.S. Pat. No. 2,194,247 shows a piston pin connection between the piston and the connecting rod wherein blocks of different geometric shapes are mounted on the ends of the round pin and are fitted in suitably shaped holes in the piston. However, the design is such that the piston load is taken on angled surfaces for the purpose of spreading the skirt of the piston under load and thus does not provide the planar load interface surface perpendicular to the cylinder axis, i.e., the direction of load, provided by the present invention.

SUMMARY OF THE INVENTION

Accordingly, it is an object of the invention described and claimed herein to provide a piston pin having parallel planar end surfaces for fastening to the underside of the piston and a cylindrical center portion to provide a bearing connection to the connecting rod.

It is another object of this invention to provide a piston assembly including a pin having a cylindrical center bearing surface for connection to the connecting rod and a planar bearing surface for fastening to the underside of the piston head for even distribution of the piston load on the piston pin.

It is a further object of this invention to provide a piston assembly wherein the piston pin is fixedly fastened to the underside of the piston head for even distribution of the load across the interface between the piston pin and piston.

These objects of the invention are accomplished by providing a piston assembly wherein the underside of the piston is provided with planar bearing surfaces disposed perpendicularly to the axis thereof and the ends of the piston pin are provided with mating planar surfaces parallel with the axis of the pin for fastening the pin to the underside of the piston head. The piston pin further includes a cylindrical bearing surface disposed between the ends for connection to the connecting rod.

The piston assembly of the invention provides better load distribution across the mating interface surfaces, thereby permitting the use of higher engine cylinder pressures in operation. The invention further provides a lighter weight piston configuration with less inertia, permitting higher piston speeds in a reciprocating engine.

A further advantage of the invention is that it permits positioning of the oil ring or sealing rings at any location along the length of the piston because the piston pin does not extend through the side of the piston. The connecting rod bushing and the bearing diameter of the piston pin engaging the bushing may be made to suit the load, resulting in a reduced diameter pin and bushing because the pin diameter is not dictated by the piston pin bore diameter as in conventional designs.

Another advantage of the invention that, because the piston pin is fixably attached to the underside of the piston head, the piston pin functions as an autothermic strut to control piston skirt expansion as the piston heats up, thereby allowing a tighter piston skirt-to-bore fit to be used so that noise from piston slap is reduced.

DESCRIPTION OF THE DRAWINGS

Other objects and advantages of the invention will become more apparent upon a perusal of the detailed description thereof and upon reference to the drawings, in which.

DESCRIPTION OF THE PREFERRED EMBODIMENT

Figure 2:
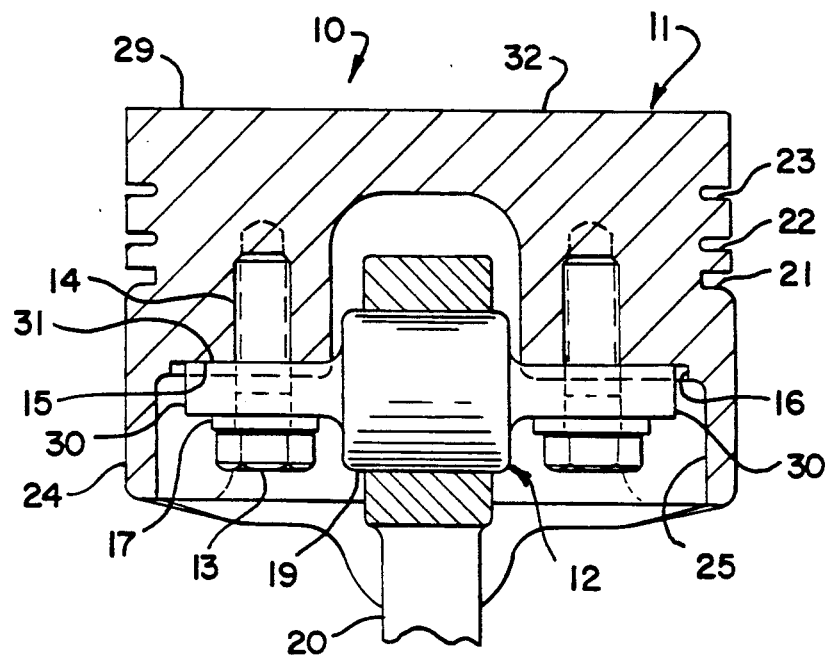
FIG. 2 is a cross section of the piston assembly of FIG. 1 taken on line II—II thereof, and further illustrating a connecting rod mounted on the pin.
Figure 1:
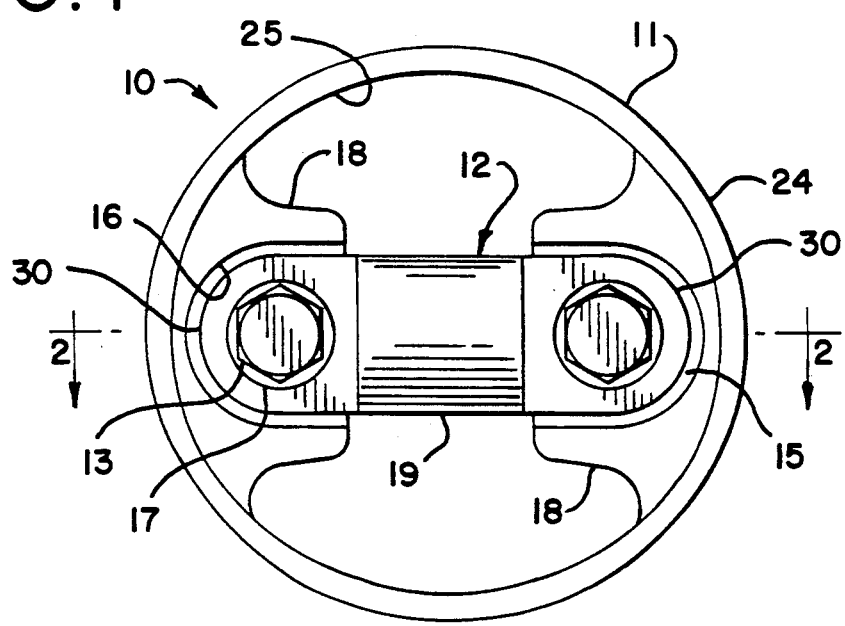
FIG. 1 is a bottom plan view of a piston assembly of the present invention.

Referring to the drawings, a diesel internal combustion engine piston assembly 10 is shown to include a cylindrical aluminum alloy piston 11 of the type having a piston head 29 and a peripheral skirt 24 depending therefrom to form a cavity 25 thereinside. The piston 11 is removably secured to a piston pin 12 disposed entirely within the cavity 25, the pin having U-shaped end portions 30 of generally rectangular cross section having planar surfaces 31 which seat respectively on mating planar surfaces 15 in the piston. The piston planar surfaces 15 are disposed in a single radial plane perpendicular to the axis of the piston 11 in U-shaped recesses 16 formed within the periphery of the piston skirt 24 in bosses 18 cast on the underside of the piston head 29 and defining a clearance recess therebetween for the end of a connecting rod 20. The pin is secured to the underside of the piston head 29 by means of bolts 13 threadedly engaged in holes 14 formed in the bosses 18 with lock washers 17 maintaining the tightness of the bolts. The piston pin 12 is further provided with a center cylindrical portion 19 forming a bearing surface for rotatably engaging the connecting rod 20. The exterior of the piston 11 is provided with ring grooves 21, 22 and 23 adapted for receiving conventional piston rings for sealing the upper side 32 of the piston head within an engine cylinder. As is conventional in a diesel engine, a combustion chamber may be formed in the upper side 32 of the piston head 29. Because the piston pin does not mount to or through the periphery of the piston, as in conventional trunk pistons, the skirt 24 of the piston is not only shorter than in conventional pistons but also the conventional pin bore supporting bosses are absent, both of which substantially reduce the weight of the piston compared to conventional pistons.

Figure 3:
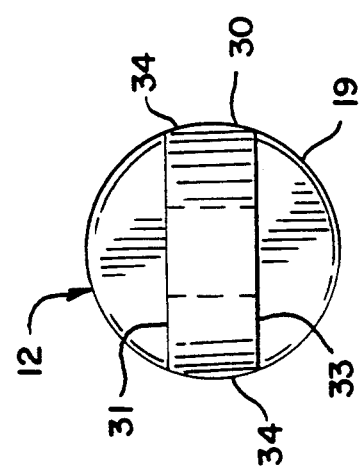
FIG. 3 is an end view of the piston pin showing the circular bearing surface on the center of the pin and the planar construction of the ends of the pin for engaging the undersurface of the piston head.
Figure 4:
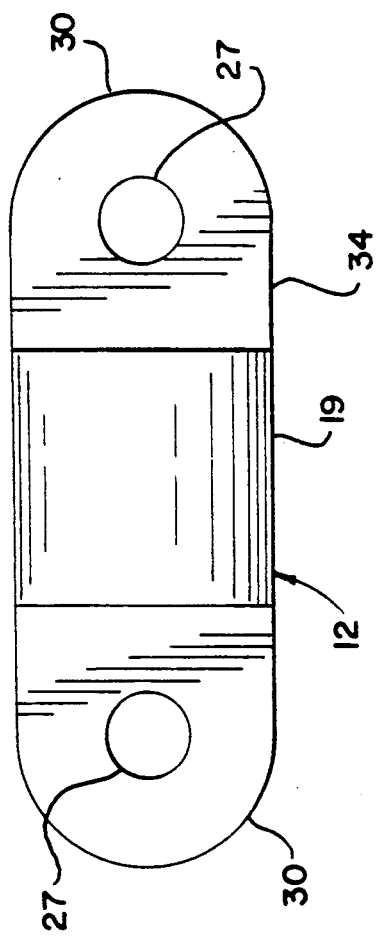
FIG. 4 is a plan view of the piston pin showing the cylindrical center portion and the two U-shaped end portions.
Figure 5:
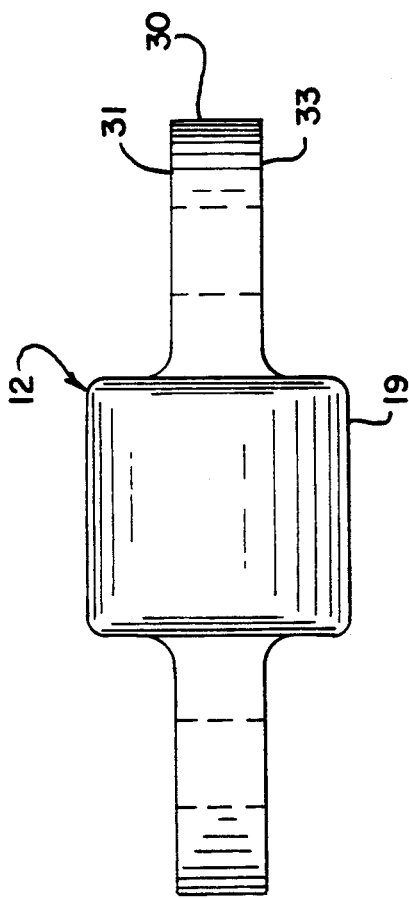
FIG. 5 is a side view of the piston pin showing the cylindrical center portion and the planar surfaces on the two end portions of the pin.

FIGS. 3, 4, and 5 illustrate the pin 12 in greater detail, including the center cylindrical portion 19 and the adjoining U-shaped end portions 30, on which the planar surfaces 31 are formed to mate with the planar surfaces 15 on the underside of the piston. A parallel planar surface 33 is provided on each end portion to provide a seating surface for the lock washers 17 on bolts 13. The lateral edges 34 of the end portions are cylindrical segments of the same diameter as the center portion and forming a continuation of the surface thereof to facilitate installation of the pin in the connecting rod and give the pin end portions a generally rectangular appearance. In this regard, although the piston and pin are shown with mating flat surfaces lying in a single plane perpendicular to the piston axis, it is conceivable that other surface configurations, for example, stepped planar surfaces, would be acceptable so long as the surfaces mate to provide area contact therebetween as opposed to the line contact provided by a conventional piston pin in a conventional pin bore. With the planar surfaces shown, the bolt holes 27 in the piston pin 12 must have a relatively close fit with the bolts 13 to locate the pin relative to the piston to assure the proper position of the cylindrical portion of the pin in the connecting rod bushing as well as the proper rotational position of the piston in the engine cylinder. Optionally, a locating means such as a dowel pin could be utilized to define the pin position relative to the piston.

The piston assembly operates in the following manner. The connecting rod 20 is installed on the cylindrical center portion 19 of the piston pin 12. Then, the planar surfaces 31 of the end portions 30 of the piston pin 12 are firmly seated on the planar surfaces 15 on the underside of the piston 11 and the pin is fastened thereto by the bolts 13 and lock washers 17 to form a fixed structure on the bottom of the head of the piston. The planar surfaces on the pin and the underside of the piston head distribute the load evenly across the interface therebetween and allow the use of a reduced weight piston for a given cylinder load requirement reducing inertia forces.

Thus, there has been provided, in accordance with the invention a piston assembly which fully satisfies the objects, aims and advantages set forth above. It is recognized that others may develop variations, alternatives and modifications of the invention after a perusal of the foregoing specification. Accordingly, it is intended to cover all such variations, modifications, and alternatives as may fall within the scope of the appended claims.

What is claimed is:

1. A piston assembly for an internal combustion engine comprising:
    a cylindrical piston having first planar surfaces disposed on an underside thereof in a radial plane relative to the piston axis;
    a piston pin providing a single transverse axis for rocking motion of said piston thereabout, said piston pin having a center portion providing a cylindrical surface disposed about said axis adapted for engagement with a connecting rod and end portions having second planar surfaces matingly engaging said first planar surfaces on said piston; and
    fastening means for fixedly securing said pin to said piston.

2. A piston assembly as set forth in claim 1 in which each of said end portions of said piston pin have third planar surface parallel to said second planar surfaces to form a generally rectangular shaped cross section.

3. A piston assembly as set forth in claim 2 wherein the peripheral edges of said end portions of said pin intersecting said second planar surfaces form a continuation of the cylindrical surface of said center portion.

4. A piston assembly as set forth in claim 1 including boss means cast on the underside of said piston, and U-shaped recesses formed in said bosses and opening toward said piston axis, said end portions of said piston pin being received therein.

5. A piston assembly as set forth in claim 1 wherein said fastening means include bolts and lock washers.

6. A piston assembly as set forth in claim 1 wherein said piston includes a peripheral skirt portion, said piston pin being disposed entirely within the inner periphery of said skirt portion.

7. A piston assembly as set forth in claim 1 wherein the cylindrical periphery of said piston includes piston ring grooves and a skirt disposed below said ring grooves, said skirt being characterized by the absence of large bores extending therethrough.

8. An internal combustion engine piston assembly comprising:
    a cylindrical piston having a piston head and a peripheral skirt depending therefrom to define an inner cavity, said piston having first planar surfaces diametrally disposed perpendicularly to the axis thereof on the underside of said piston head;
    a piston pin disposed entirely within said cavity, said pin having end portions including second planar surfaces matingly engaging said first planar surfaces on said piston, and a center cylindrical portion adapted for connection to a connecting rod; and
    means for fastening the pin to the piston.

9. A piston assembly as set forth in claim 8 wherein said fastening means include bolts.

10. An internal combustion engine piston comprising a cylindrical piston having a radially extending piston head and a peripheral skirt depending therefrom to define an inner cavity, a cylindrical periphery of said piston including piston ring grooves, said skirt being disposed below said ring grooves and being characterized by the absence of piston pin bores extending therethrough, said piston having diametrally opposed bosses integrally cast on the bottom side of said piston head within said cavity, said bosses defining a connecting rod recess therebetween, opposing recesses are disposed in said bosses, said recesses being U-shaped in a radial plane and opening toward the piston axis, diametrally disposed planar surfaces comprising the upper side of said recesses being formed on said bosses perpendicularly to the axis thereof on the underside of said piston head within said cavity, and fastener receiving means disposed in said piston head underside intersecting said planar surfaces.

11. A piston as set forth in claim 10 wherein the diametral distance between the diametrally outer edges of said planar surfaces is shorter than the diameter of said cavity.

* * * * *